(No Model.)

S. ROSS, Jr.
SAND PAPER ROLL.

No. 426,859. Patented Apr. 29, 1890.

Witnesses
J. Watson Sims
J. A. Rutherford

Inventor
Simon Ross Jr.
By his Attorneys
Hood & Boyd

United States Patent Office.

SIMON ROSS, JR., OF CINCINNATI, OHIO, ASSIGNOR TO THE ROSS, MOYER MANUFACTURING COMPANY, OF SAME PLACE.

SAND-PAPER ROLL.

SPECIFICATION forming part of Letters Patent No. 426,859, dated April 29, 1890.

Application filed May 17, 1889. Serial No. 311,154. (No model.)

*To all whom it may concern:*

Be it known that I, SIMON ROSS, Jr., a citizen of the United States, and a resident of Cincinnati, in the county of Hamilton and State of Ohio, have invented certain new and useful Improvements in Sand-Paper Rolls, of which the following is a specification.

The object of my invention is to support the sand-paper upon a rubber roll which contains radial projections, upon the extremities of which the sand-paper is supported, and between which air-circulating spaces are furnished, so as to keep the parts cool, and to furnish suitable means for attaching the sand-paper thereto, all of which will be fully set forth in the description of the accompanying drawings, making a part of this specification, in which—

Figure 1:
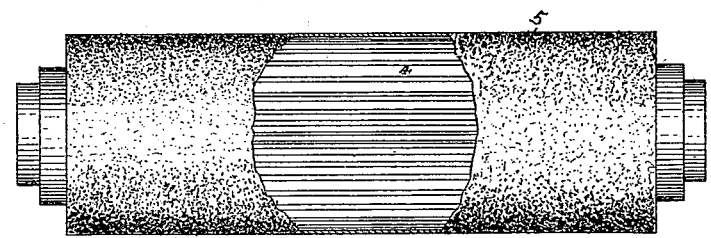
Figure 2:
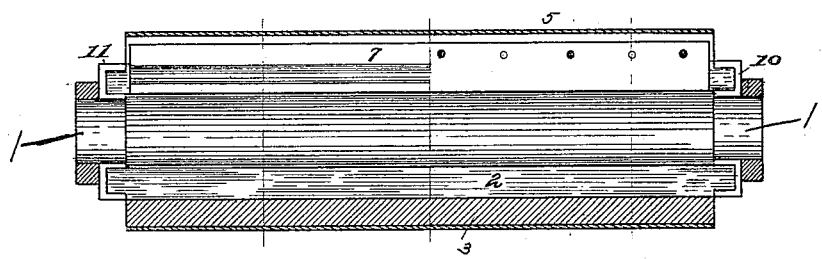
Figure 3:
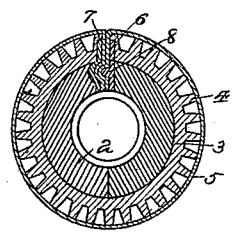

Figure 1 is a side elevation of my improvement with the sand-paper broken off to show the roll. Fig. 2 is a central longitudinal section of the same. Fig. 3 is an end view of one form of construction, and Fig. 4 an end view of a modified form.

1 represents the shaft or drum on which the roll is placed to rotate it.

2 represents supporting-sections around the shaft, on which is placed the cylindrical rubber roll 3. This rubber roll is provided with a series of radial ribs 4, which project out a considerable distance from the surface of the roll and are made integral therewith. These ribs or projections are flexible at the ends, and are made of considerable depth and length, so as to allow of the free circulation of air endwise between the sand-paper and the base of the rubber roll from which the ribs spring. The rubber roll 2 is made of one piece slotted through, so as to allow the sections 2 to expand or open out for attaching the sand-paper. The rubber will serve as a hinge to allow the opening and yielding of the roll.

Figure 4:
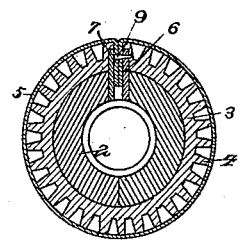

I have shown two modes of holding the sand-paper in position clamped between the roll. In Fig. 3 I have shown a rib and groove 8, which run longitudinally along the edges of the sections 2, the ends of the sand-paper being brought down to overlap the rib and groove 8, when the roll is compressed or drawn together to hold the sand-paper firmly on the roll. These clamps are of ordinary construction. A modification of this form of holding is shown in Fig. 4, in which metallic strips project from the jaws. The said rolls are provided with pins or teeth on one side, which enter grooves on the opposite clamp and thus pass through the sand-paper, which is held between these teeth, and the said sections of the rolls are drawn together by clamps. It is preferred to have the radial projections at the sectional joint where the sand-paper is clamped between the sections of the roll close to the edge, so as to form a vertical support close to the sectional joint. These projections on the clamps are not absolutely indispensable; but the sand-paper is held firmly in place by reason thereof.

Having described my invention, what I claim is—

1. The combination of the shaft 1, the supporting-sections 2, the cylindrical rubber roll 3, having radial projections 4, and the annular clamps 10 and 11, for uniting said sections together, substantially as specified.

2. In a burnishing-roll, the combination of the sand-paper, the sectional cylindrical support 2, the rubber roll 3, having radial projections 4, with projections and indentations 8 on the face of the jaws, and annular clamps for holding said sectional roll together, substantially as specified.

3. In combination with the spindle 1 and supporting-sections 2, the split rubber roll 3, having the radial projections 4, two of said projections on either side of the sectional joint being close to the edge thereof, substantially as specified.

In testimony whereof I have hereunto set my hand.

SIMON ROSS, JR.

Witnesses:
T. SIMMONS,
WM. F. ROSS.